Patented Jan. 2, 1940

2,185,182

UNITED STATES PATENT OFFICE 2,185,182

MEROCYANINE DYES AND PROCESS OF PREPARING THEM

Leslie G. S. Brooker, Rochester, N. Y., assignor to Eastman Kodak Company, Rochester, N. Y., a corporation of New Jersey No Drawing. Application July 15, 1937, Serial No. 153,817

21 Claims. (Cl. 260—257)

This invention relates to dyes and a process for preparing the same. The new dyes of my invention can be called merocyanine dyes. This application is a continuation-in-part of my copending application Serial No. 739,502, filed August 11, 1934.

The new dyes of my instant invention can be formulated as follows:

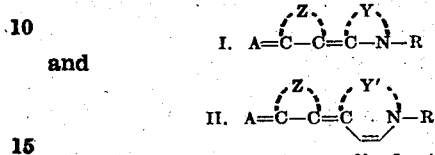

wherein A represents a divalent non-metallic atom of the oxygen group of elements, such as oxygen or sulfur, R represents an alkyl group, Y and Y' represent the non-metallic atoms necessary to complete a heterocyclic nucleus devoid of nuclear carbonyl groups, e. g. oxocarbonyl (commonly called carbonyl) and thiocarbonyl groups, and Z represents the non-metallic atoms necessary to complete a heterocyclic nucleus. It is very likely that the new dyes are resonance hybrids between the two forms which can be illustrated as follows for formula I:

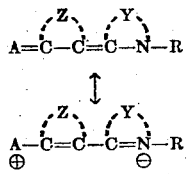

More specifically, in the above formulas R can represent any alkyl group, such as methyl, ethyl, n-butyl, isobutyl, allyl, isopropyl, n-propyl and n-decyl, for example. Y can represent the non-metallic atoms necessary to complete a five-membered heterocyclic nucleus, such as a thiazole nucleus, for example, 4-methylthiazole, 4-phenylthiazole, 4,5-diphenylthiazole, benzothiazole or naphthothiazole nuclei, a selenazole nucleus, for example, 4-methylselenazole, 4-phenylselenazole or benzoselenazole nuclei, an oxazole nucleus, such as 4-methyloxazole, 4-phenyloxazole, benzoxazole or naphthoxazole nuclei, a thiazoline nucleus, a 3,3-dialkylindolenine nucleus or a selenazoline nucleus. Y and Y' can represent the non-metallic atoms necessary to complete a six-membered heterocyclic nucleus, such as a pyridine nucleus or a quinoline nucleus, for example, 6-methylquinoline or benzoquinoline. Z can represent the non-metallic atoms necessary to complete a five-membered heterocyclic nucleus for example, a 2,4,(3,5)-thiazoledione nucleus, such as 2,4(3,5)-thiazoledione, 3-alkyl-2,4(3,5)-thiazoledione, 3-phenyl-2,4(3,5)-thiazoledione or 3-naphthyl-2,4(3,5)-thiazoledione nuclei, a 2-thio-2,4(3,5)-thiazoledione (a rhodanine) nucleus, such as 3-alkyl-2-thio-2,4(3,5)-thiazoledione (3-alkylrhodanine) 3 - phenyl-2-thio-2,4(3,5)-thiazoledione (3-phenylrhodanine), 3-naphthyl-2-thio-2,4(3,5)-thiazoledione (3 - naphthylrhodanine) nuclei or 3-(1-benzothiazyl)-2-thio-2,4(3,5)-thiazoledione (3-(1-benzothiazyl)-rhodanine) nuclei, a 2,4-dithio-2,4(3,5)-thiazoledione (4-thiorhodanine) nucleus, such as 2,4-dithio-2,4(3,5) thiazoledione or its 3-alkyl, 3-phenyl or 3-naphthyl derivatives, a 2-alkylmercapto-4(5)-thiazolone nucleus, such as 2-ethylmercapto-4(5)-thiazolone, a 2,4(3,5)-thiazoledione nucleus, such as 2,4(3,5)-thiazoledione or its 3-alkyl, 3-phenyl or 3-naphthyl derivatives, a thiazolidone nucleus, such as 4-thiazolidone or its 3-alkyl, 3-phenyl or 3-naphthyl derivatives, a 2-alkylphenylamino-4(5)-thiazolone nucleus, or a 2-diphenylamino-4(5)-thiazolone nucleus; an oxazolone nucleus, for example, a 2 - thio-2,4(3,5) - oxazoledione nucelus, such as 3-alkyl-2-thio-2,4(3,5)-oxazoledione nucleus; an imidazolone nucleus, for example, a 2,4(3,5)-imidazoledione nucleus, such as 2,4(3,5)-imidazoledione (hydantoin) or its 3-alkyl, 3-phenyl or 3-naphthyl derivatives, as well as its 1,3-dialkyl, 1-alkyl-3-phenyl, 1-alkyl-3-naphthyl, 1,3-diphenyl, etc., derivatives, a 2-thio-2,4(3,5)-imidazoledione nucleus, such as 2-thio-2,4(3,5)-imidazoledione (2-thiohydantoin) or its 3-alkyl, 3-phenyl or 3-naphthyl derivatives, as well as its 1,3-dialkyl, 1-alkyl-3-phenyl, 1-alkyl-3-naphthyl, 1,3 - diphenyl, etc., derivatives, a 4-thio-2,4(3,5)-imidazoledione nucleus such as 4-thio-2,4(3,5)-imadazoledione (4-thiohydantoin) or its 3-alkyl, 3-phenyl or 3-naphthyl derivatives, as well as its 1,3-dialkyl, 1-alkyl-3-phenyl, 1-alkyl-3-naphthyl, 1,3-diphenyl, etc., derivatives, a 2-alkylmercapto-5(4)-imidazolone, such as 2-propylmercapto-5(4)- imidazolone; a thionaphthenone nucleus, such as 2-(1)-thionaphthenone or 1(2)-thionaphthenone, a pyrazolone nucleus, for example, a 5-thiopyrazolone, such as 1-phenyl-3-methyl-5-thiopyrazolone; an oxindole nucleus, such as 2,3-dihydro-3-ketoindole, and like five-membered heterocyclic nuclei. Z can also represent the non-metallic atoms necessary to complete a six-membered heterocyclic nucleus, such as a 2,4,6-triketohexahydropyrimidine nucleus, for example, barbituric acid or 2-thiobarbituric acid, as well as their 1-alkyl or 1,3-dialkyl derivatives; a 3,4-dihydro-2(1)-quinoline nucleus, such as 3,4-dihydro-2(1)-quinoline (dihydrocarbostyril); a 3,4-dihydro-2(1)-quinoxalone nucleus, such as 3,4-dihydro-2(1)-quinoxalone (oxydihydroquinoxaline); 3-phenomorpholone (1,4,2-benzoxazine-3(4)-one or benzo-β-morpholone) nuclei; 1,4,2-benzothiazine-3(4)-one (ketodihydrobenzoparathiazine) nuclei and the like six-membered heterocyclic nuclei.

I am aware that indigoid types of dyes are known and do not intend to embrace that type of dye. My invention is particularly concerned with dyes which can be called merocyanine dyes.

My new dyes can be prepared by reaching a cyclammonium quaternary salt containing a reactive group, such as a halogen atom, particularly an iodine atom, a substituted-mercapto group or an aryloxy group, for example, in the alpha or gamma position, i. e. one of the so-called reactive positions, with a heterocyclic organic compound containing a nuclear methylene group adjacent to a nuclear carbonyl group, such as an oxocarbonyl or thiocarbonyl group, for example.

The reactions are advantageously effected in the presence of a basic condensing agent, strong organic bases, particularly strong tertiary organic bases whose aqueous solutions have dissociation constants substantially greater than that of pyridine are advantageously employed. Examples of such strong organic bases are triethyl amine, tributyl amines, N-methylpiperidine and triethanol amine. Other basic condensing agents can be employed, for example, sodium carbonate, sodium hydroxide, potassium carbonate or sodium ethylate. The reactions are advantageously effected in the presence of a diluent, lower aliphatic alcohols, i. e. those of the formula $C_nH_{2n+1}OH$ wherein $n$ represents 1, 2, 3 or 4, are advantageously employed. Ethyl, isopropyl and n-propyl alcohols are particularly useful. Other diluents can be employed. Heat accelerates the formation of my new dyes.

As cyclammonium quaternary salts, I employ any quaternary salt, such, for example, as corresponds to the heterocyclic nuclei set forth under Y of the above formulas and containing a reactive group in the alpha or gamma position. I have found that alkyl halides, particularly alkiodides, are advantageously employed. As heterocyclic organic compounds containing a nuclear reactive methylene group adjacent to a nuclear carbonyl group, I employ any heterocyclic organic compound containing a nuclear reactive methylene group adjacent to a nuclear carbonyl group, such, for example, as corresponds to the heterocyclic nuclei set forth under Z of the above formulas. I have found that heterocyclic organic compounds containing a nuclear reactive methylene group adjacent to a nuclear oxacarbonyl group are advantageously employed. I have found that ordinarily the cyclammonium quaternary salt and the heterocyclic organic compound can be employed in equimolecular proportions. However, an excess of either can be employed. The basic condensing agent is likewise ordinarily employed in an amount sufficient to bind the elements of acid eliminated from the condensing molecules, although smaller or larger amounts can be employed. A small excess of condensing agent is ordinarily suitable.

The dyes wherein Z of the above formulas represents the non-metallic atoms necessary to complete a five-membered heterocyclic organic nucleus having a nuclear nitrogen and nuclear sulfur atom are particularly useful in preparing optically sensitized photographic emulsions I have found.

While the process of preparing my new dyes is subject to variation, particularly as respects the nature and quantity of reactants employed, the nature and quantity of condensing agent employed, the nature and quantity of diluent employed, the temperature employed, and the methods of isolation and purification of the dyes, the following examples serve to illustrate the manner of practicing my invention:

EXAMPLE 1.—5-(1-ethyl-2-quinolylidene)-rhodanine 2.66 parts of rhodanine, 8.2 parts of 2-iodoquinoline ethiodide and 4.24 parts of triethylamine were refluxed in 25 parts of absolute ethyl alcohol for about 15 minutes. The dye separated from the hot solution. It was filtered off and recrystallized from glacial acetic acid, giving brownish red needles with a green reflex. The methyl alcohol solution was orange in color.

EXAMPLE 2.—5-(1-ethyl-2-quinolylidene)-3-phenylrhodanine 2.1 parts of 3-phenylrhodanine and 4.1 parts of 2-iodoquinoline ethiodide were refluxed with 55 parts of absolute ethyl alcohol and 2.1 parts of triethylamine for about fifteen minutes. The dye separated from the cooled solution. It was filtered off and recrystallized from glacial acetic acid, yielding red crystals with a green reflex.

EXAMPLE 3.—5-(1-ethyl-2-quinolylidene)-2,4,6-triketohexahydropyrimidine 2.6 parts of barbituric acid and 8.2 parts of 2-iodoquinoline ethiodide were refluxed with 200 parts of absolute ethyl alcohol and 4.24 parts of triethylamine for about fifteen minutes. The dye was filtered from the cooled solution. It was recrystallized from methyl alcohol, yielding yellow crystals.

EXAMPLE 4.—5-(1-ethyl-2-quinolylidene)-2-thio-2,4,6-triketohexahydropyrimidine 1.4 parts of thiobarbituric acid and 4.1 parts of 2-iodoquinoline ethiodide were refluxed with 80 parts of absolute ethyl alcohol and 2.1 parts of triethylamine for about twenty minutes. The dye was recrystallized from water yielding orange colored crystals.

EXAMPLE 5.—5-(1-ethyl-2-pyridylidene)-3-phenylrhodanine 2.1 parts of 3-phenylrhodanine and 3.6 parts of 2-iodopyridine ethiodide were refluxed with 2.12 parts of triethylamine and 30 parts of absolute ethyl alcohol for about fifteen minutes. The dye was filtered from the cooled solution. It was recrystallized from methyl alcohol, giving reddish-brown plates which gave a yellow-orange solution in methyl alcohol.

EXAMPLE 6.—5-(1-ethyl-2-β-naphthoquinolylidene)-3-phenylrhodanine 0.3 part of 3-phenylrhodanine and 0.66 part of 2-iodo-β-naphthoquinoline ethiodide were refluxed with 0.3 part of triethylamine and 15 parts of absolute ethyl alcohol for fifteen minutes. The dye was filtered from the cooled solution. It was recrystallized from glacial acetic acid, giving brick red crystals which gave a red solution in methyl alcohol. β-naphthoquinoline is also called 5,6-benzoquinoline.

Example 7.—5-(1-ethyl-2-quinolylidene)-rhodanine 0.44 g. (1 mol.) of rhodanine, 1.3 g. (1 mol.) of 2-phenylthioquinoline ethiodide and 0.36 g. (1.05 mol.) of triethylamine were refluxed in 15 cc. of absolute ethyl alcohol for fifteen minutes. The dye separated from the chilled solution. Yield 69%. Following recrystallization from glacial acetic acid, the dye was obtained in the form of red crystals with a green reflex. Yield 52%. 2-(n-butylthio)-, 2-(p-tolylthio)-, 2-(β-naphthylthio)- or 2-(1-benzothiazolylthio)quinoline can also be condensed with rhodanine to yield the same merocyanine.

Example 8.—3-ethyl-5-(1-ethyl-2-quinolylidene)-rhodanine 0.32 g. (1 mol.) of 3-ethylrhodanine, 0.8 g. (1 mol.) of 2-phenylthioquinoline ethiodide and 0.21 g. (1.05 mol.) of triethylamine were refluxed in 15 cc. of absolute ethyl alcohol for fifteen minutes. The dye separated from the chilled solution. Yield 69%. Following recrystallization from glacial acetic acid, the dye was obtained as red crystals. Yield 50%.

Example 9.—5-(1-ethyl-2-quinolylidene)-3-phenyl-rhodanine 0.52 g. (1 mol.) of 3-phenylrhodanine, 1.0 g. (1 mol.) of 2-phenylthioquinoline ethiodide and 0.26 g. (1.05 mol.) of triethylamine were refluxed in 15 cc. of absolute ethyl alcohol for fifteen minutes. The dye separated from the chilled solution. Yield 88%. Following recrystallization of the dye from glacial acetic acid, the dye was obtained as brownish red crystals with green reflex. Yield 66%.

By employing 2-phenylthiopyridine ethiodide with 3-phenylrhodanine, 5-(1-ethyl-2-pyridylidene)-3-phenylrhodanine is obtained in the form of reddish-brown crystals upon recrystallization from methyl alcohol.

Example 10.—3-ethyl-5-(1-ethyl-2-quinolylidene)-1-phenyl-2-thiohydantoin 1.1 g. (1 mol.) of 3-ethyl-1-phenyl-2-thiohydantoin, 2.0 g. (1 mol.) of 2-phenylthioquinoline ethiodide and 0.53 g. (1.05 mol.) of triethylamine were refluxed for fifteen minutes in 20 cc. of absolute ethyl alcohol. The dye separated from the chilled solution. Yield 73%. Following recrystallization from methyl alcohol (365 cc. per gram of dye), the dye was obtained as dark greenish crystals.

The 3-ethyl-1-phenyl-2-thiohydantoin used in this preparation was prepared by heating 17.0 g. (1 mol.) of phenyl glycine ethyl ester and 8.7 g. (1 mol.) of ethyl isothiocyanate in an open flask on the steam bath for 48 hours. The heavy viscous syrup so obtained was diluted with methyl alcohol, precipitating the compound. Yield 63%. Following recrystallization from methyl alcohol (10 cc. per gram of compound), the compound was obtained in a yield of 50%.

Example 11.—3-ethyl-5-(1-ethyl-2-quinolylidene)-2-thio-2,4(3,5)-oxazoledione 0.7 g. (1 mol.) of 3-ethyl-2-thio-2,4(3,5)-oxazoledione, 2.0 g. (1 mol.) of 2-phenylthioquinoline ethiodide and 0.53 g. (1.05 mol.) of triethylamine were refluxed in 20 cc. of absolute ethyl alcohol for fifteen minutes. The dye separated from the chilled solution. Yield 63%. Following recrystallization from methyl alcohol (300 cc. per gram of dye), the dye was obtained as orange prisms. Yield 53%.

Example 12.—5-(2-ethyl-1-benzothiazylidene)-rhodanine 1.1 g. (1 mol.) of 1-methylthiobenzothiazole ethiodide, 0.44 g. (1 mol.) of rhodanine and 0.35 g. (1.05 mol.) of triethylamine were refluxed in 20 cc. of absolute ethyl alcohol for fifteen minutes. The dye separated from the chilled solution. Yield 75%. Following recrystallization from pyridine (30 cc. per gram of dye), the dye was obtained as bright yellow powder. Yield 45%.

The 1-methylthiobenzothiazole ethiodide used in this preparation was made by heating 1-methylthiobenzothiazole (20 g.; 1 mol.) and ethyl iodide (21.7 g.; 1.25 mol.) for 48 hours on the steam bath. The yield was 31%.

The 1-methylthiobenzothiazole used above was prepared by treating 1-mercaptobenzothiazole (50 g.; 1 mol.) with dimethyl sulfate (57 g.; 1.5 mol.) in the presence of aqueous sodium hydroxide (57 g.; 1.5 mol.). Yield 92%. Following distillation the 1-methylthiobenzothiazole was obtained as a clear liquid. Yield 80%.

1-methylthiobenzoxazole and its ethiodide, as well as 1-phenylthiobenzothiazole, 1-phenylthiobenzoxazole, 1-(n-butylthio)-benzothiazole, 1-(n-butylthio)-benzoxazole, 1-(β-naphthylthio)-benzothiazole and 1-(β-naphthylthio)-benzoxazole and their ethiodides can be made in the same manner. These ethiodides can all be condensed with rhodanines, hydantoins, 2,4(3,5)-oxazolediones and the like.

Example 13.—3-ethyl-5-(2-ethyl-1-benzothiazylidene)-rhodanine 0.53 g. (1 mol.) of 3-ethylrhodanine, 1.1 g. (1 mol.) of 1-methylthiobenzothiazole ethiodide and 0.35 g. (1.05 mol.) of triethylamine were refluxed in 15 cc. of absolute ethyl alcohol for fifteen minutes. The dye separated from the chilled solution. Yield 93%. Following recrystallization from pyridine (25 cc. per gram of dye), the dye was obtained as yellow crystals with a blue reflex. Yield 75%.

Example 14.—5-(2-ethyl-1-benzothiazylidene)-3-phenyl-rhodanine 0.7 g. (1 mol.) of 3-phenylrhodanine, 1.1 g. (1 mol.) of 1-methylthiobenzothiazole ethiodide and 0.35 g. (1.05 mol.) of triethylamine were refluxed in 15 cc. of ethyl alcohol for fifteen minutes. The dye separated from the chilled solution. Yield 90%. Following recrystallization from pyridine (90 cc. per gram of dye), the dye was obtained as bright yellow crystals. Yield 73%.

Example 15.—3-ethyl-5-(2-ethyl-1-benzothiazylidene)-2-thio-2,4(3,5)-oxazoledione 0.48 g. (1 mol.) of 3-ethyl-2-thio-2,4(3,5)-oxazoledione, 1.1 g. (1 mol.) of 1-methylthiobenzothiazole and 0.35 g. (1.05 mol.) of triethylamine were refluxed for fifteen minutes in 15 cc. of absolute ethyl alcohol. The dye separated from the chilled solution. Yield 75%. Following recrystallization from glacial acetic acid (20 cc. per gram of dye), the dye was obtained as pale yellow crystals. Yield 55%.

Example 16.—5-(2-ethyl-1-benzothiazylidene)-1,3-diphenyl-2-thiohydantoin 0.9 g. (1 mol.) of 1,3-diphenyl-2-thiohydantoin, 1.1 g. (1 mol.) of 1-methylthiobenzothiazole ethiodide and 0.35 g. (1.05 mol.) of triethylamine were refluxed in 15 cc. of absolute ethyl alcohol for fifteen minutes. The dye separated from the chilled solution. Yield 77%. Following recrystallization from glacial acetic acid (35 cc. per gram of dye), the dye was obtained as dull yellow crystals. Yield 40%.

EXAMPLE 17.—*1 - (2 - ethyl-1-benzothiazylidene)-2(1)-thionaphthenone*

0.5 g. (1 mol.) of 2(1)-thionaphthenone, 1.1 g. (1 mol.) of 1-methylthiobenzothiazole ethiodide and 0.35 g. (1.05 mol.) of triethylamine were refluxed in 20 cc. of absolute ethyl alcohol for fifteen minutes. The dye separated from the chilled solution. Yield 80%. Following recrystallization from glacial acetic acid (25 cc. per gram of dye), the dye was obtained as yellow crystals. Yield 60%.

EXAMPLE 18.—*5-(2-ethyl-1-benzothiaxylidene)-2-diphenylamino-4(5)-thiazolone*

0.45 g. (1 mol.) of 2-diphenylamino-4(5)-thiazolone, 0.56 g. (1 mol.) of 1-methylthiabenzothiazole ethiodide and 0.18 g. (1.05 mol.) of absolute ethyl alcohol were refluxed in absolute ethyl alcohol (15 cc.) for fifteen minutes. The dye separated from the chilled solution. The yield of crude dye was 30%. Following recrystallization from glacial acetic acid (50 cc. per gram of dye), the dye was obtained as a pale yellow powder. Yield 23%.

EXAMPLE 19.—*3 - ethyl-5-(2 - ethyl-1-benzoxazylidene)-rhodanine*

1.61 g. (1 mol.) of 3-ethylrhodanine, 3.22 (1 mol.) of 1-methylthiobenzoxazole ethiodide and 1.06 g. (1.05 mol.) of triethylamine were refluxed for fifteen minutes in 35 cc. of absolute ethyl alcohol. The dye separated from the chilled solution. Yield 50%. The dye was recrystallized from glacial acetic acid and obtained as yellow crystals. Yield 35%.

The 1-methylthiobenzoxazole ethiodide used in this preparation was made according to the process given in Example 12 for 1-methylthiobenzothiazole ethiodide.

EXAMPLE 20.—*α-(2-ethyl - 1 - benzothiazylidene)-benzoylacetonitrile*

0.24 g. (1 mol.) of benzoylacetonitrile, 0.56 g. (1 mol.) of 1-methylthiobenzothiazole ethiodide and 0.18 g. (1.05 mol.) of triethylamine were refluxed in 15 cc. of absolute ethyl alcohol for fifteen minutes. The dye separated from the chilled solution. Yield 70%. Following recrystallization from glacial acetic acid (25 cc. per gram of dye), the dye was obtained as a colorless compound.

EXAMPLE 21.—*3-ethyl-5-(2-ethyl - 1 - benzothiazylidene)-rhodanine*

0.81 g. (1 mol.) of 3-ethylrhodanine, 2.0 g. (1 mol.) of 1-phenylmercaptobenzothiazole ethiodide, 0.5 g. (1 mol.) of triethylamine and 50 cc. of absolute ethyl alcohol were refluxed about 10 minutes. The reaction mixture was chilled at about 0° C. for about 12 hours. The yellow solid which separated was filtered off and washed with methyl alcohol. After two recrystallizations from pyridine the dye melted at 246° to 247° C. This same dye was prepared exactly as above, employing instead of 2.0 g. of 1-phenylmercaptobenzothiazole ethiodide, an equivalent molecular proportion of 1-phenoxybenzothiazole ethiodide. Equivalent molecular proportions of 1-(m-tolozy)-benzothiazole ethiodide or 1-(α-naphthoxy)-benzothiazole ethiodide or 1-(β-naphthoxy)-benzothiazole ethiodide likewise can be employed in the formation of the dye exactly as set forth above.

The alkylmercapto (also called alkylthio) and arylmercapto (also called arylthio) quaternary salts can be prepared from cyclammonium quaternary salts containing an iodine atom in a reactive position by reaction with a mercaptan in the presence of a basic condensing agent. Examples of the preparation of such substituted-mercapto compounds are set forth in French Patent 793,577. Among the substituted-mercapto compounds, the arylmercapto are advantageously employed. Among the arylmercapto compounds, those containing an arylmercapto group of the benzene and naphthalene series, i. e. those containing an arylmercapto group containing from six to ten nuclear carbon atoms, are advantageously employed. Alkylmercapto cyclammonium quaternary salts can also be prepared from mercapto heterocyclic nitrogen bases, e. g. 1-mercaptobenzothiazole, by alkylation, followed by conversion of the alkylated compound with an ester, such as an alkyl iodide or alkyl-p-toluenesulfonate, to form the quaternary salt. This latter method is well known in the art.

Substituted-mercapto and aryloxy derivatives of cyclammonium quaternary salts can be prepared by reacting halogen-substituted heterocyclic nitrogen bases with mercaptans or phenols and then reacting the resulting bases with an ester, such as an alkyl iodide or alkyl-p-toluenesulfonate, for example, to form the quaternary salt. The following examples serve to illustrate the process:

EXAMPLE 22.—*2-benzylmercaptoquinoline*

16.4 g. (1 mol.) of 2-chloroquinoline, 25 g. (2 mol.) of benzylmercaptan and 13 g. (2 mol.) of 85% potassium hydroxide were heated about 16 hours on a steam pot. From the brownish viscous liquid which formed, a white solid slowly separated. 200 cc. of a 5% aqueous solution of sodium hydroxide were added and the resulting mixture agitated until the potassium chloride which formed was completely dissolved. A heavy oil separated. This oil was taken up in diethyl ether, the ether solution dried over anhydrous potassium carbonate and finally distilled away. The pink residue was distilled under sub-atmospheric pressure yielding 2-benzylmercaptoquinoline boiling at 220° to 225° C. at 9 mm. of mercury pressure. It solidified upon cooling. After twice recrystallizing from methyl alcohol, it was obtained as almost colorless crystals melting at 46° to 47° C.

EXAMPLE 23.—*2-benzylmercaptoquinoline metho-p-toluenesulfonate*

12.5 g. (1 mol.) of 2-benzylmercaptoquinoline and 13.5 g. (1.5 mol.) of methyl-p-toluenesulfonate were heated at about 100° C. for about 96 hours. The brown semi-crystalline mass which formed was stirred with about 25 cc. of diethyl ether and then with about 20 cc. of acetone to remove impurities. The resulting dried crystals were twice recrystallized from methyl alcohol and obtained as colorless crystals melting at 202° to 204° C. with decomposition. This quaternary salt can be employed in my process for making merocyanine dyes by reacting with rhodanines, e. g. 3-phenyl-rhodanine, or other heterocyclic organic compounds containing a nuclear reactive methylene group adjacent to a nuclear carbonyl group.

Example 24.—1-Phenylmercaptobenzothiazole 88.0 g. (2 mol.) of thiophenol and 80.8 g. (2 mol.) of triethylamine were added alternately and under reflux, in small portions and with agitation, to 67.8 g. (1 mol.) of 1-chlorobenzothiazole warmed to 40° to 50° C. The resulting reaction mixture was heated at about 95° C. for about 24 hours. Upon cooling, 300 cc. of cold water and then 250 cc. of an aqueous solution of sodium hydroxide (prepared by diluting 56 cc. of a 40% aqueous solution of sodium hydroxide with water) were added. The 1-phenylmercaptobenzothiazole was extracted from the water mixture with 850 cc. of diethyl ether. The ether extract was washed with cold water and dried over anhydrous calcium chloride. The ether was distilled away. The residue upon distillation yielded 1-phenylmercaptobenzothiazole as a slightly yellowish liquid boiling at 183° to 187° C. at 3 mm. of mercury pressure.

Example 25. — 1-Phenylmercaptobenzothiazole ethiodide 36.5 g. (1 mol.) of 1-phenylmercaptobenzothiazole and 34.1 g. (1.5 mol.) of ethyl iodide were heated in a sealed tube at about 100° C. for about 88 hours. The dark tarry mass of crystals which formed was removed from the tube and stirred with diethyl ether until completely crystalline. The resulting brown crystals were stirred with acetone until colorless. After recrystallization from nitromethane, the ethiodide was obtained as pale yellow crystals melting at 166° to 167° C. This quaternary salt can be employed in my process for making merocyanine dyes by reacting with rhodanines, e. g. 3-ethylrhodanine, or other heterocyclic organic compounds containing a nuclear reactive methylene group adjacent to a nuclear carbonyl group.

Example 26.—4-Phenylmercaptopyridine 15.5 g. (1 mol.) of 4-chloropyridine were added to 22 g. (1 mol.) of thiophenol cooled in a freezing mixture. A vigorous reaction took place and the reaction mass set to a solid. The solid reaction mass was then heated at about 100° C. for about 10 minutes. The solid so obtained was the hydrochloride of 4-phenylmercaptopyridine. It was washed with diethyl ether and 4-phenylmercaptopyridine generated therefrom by treatment with aqueous ammonia. The free base was taken up from the ammonia reaction mixture with diethyl ether. The diethyl ether was distilled away. Upon distillation of the residue, 4-phenylmercaptopyridine was obtained as a colorless liquid boiling at 128° to 129° C. at 2 mm. of mercury pressure.

Example 27.—4-Phenylmercaptopyridine methiodide 3.4 g. (1 mol.) of 4-phenylmercaptopyridine and 6.6 g. (2 mol.) of methyl iodide were gently refluxed for about 30 minutes. The initial reaction was vigorous. The methiodide separated from the cooled reaction mixture. It was washed with diethyl ether and dried in vacuo. It was in the form of colorless crystals melting at 174° to 176° C. with decomposition. This quaternary salt can be employed in my process to make merocyanine dyes by reacting with rhodanines, e. g. 3-ethylrhodanine, or other heterocyclic organic compounds containing a reactive nuclear methylene group adjacent to a nuclear carbonyl group.

Example 28.—1-phenoxybenzothiazole 17 g. (1 mol.) of 1-chlorobenzothiazole, 18.8 g. (2 mol.) of phenol and 13.2 g. (2 mol.) of 85% powdered potassium hydroxide were heated under reflux at about 100° C. for about one hour. A brown color developed and potassium chloride separated from the reaction mixture. 200 cc. of a 3% aqueous solution of sodium hydroxide were added through the condenser and the mixture shaken to dissolve the potassium chloride. Upon cooling a brownish oil separated. This oil was taken up in diethyl ether and the ether solution dried over anhydrous potassium hydroxide. The ether was distilled away. The residue upon distillation yielded 1-phenoxybenzothiazole as a nearly colorless liquid boiling at 166° to 170° C. at 2 mm. of mercury pressure. Upon cooling the liquid solidified to colorless crystals melting at 50° to 52° C. 1-(m-toloxy)-benzothiazole prepared from m-cresol was obtained as colorless crystals melting at 66° to 68° C.

Example 29.—1-phenoxybenzothiazole ethiodide 11.4 g. (1 mol.) of 1-phenoxybenzothiazole and 12 g. (1.5 mol.) of ethyl iodide were heated in a sealed tube at 100° C. for about 88 hours. The tarry brown viscous mass formed was ground with absolute diethyl ether until crystalline. The brown crystals were crushed in acetone until nearly colorless. Upon recrystallization from nitromethane, the ethiodide was obtained as nearly colorless crystals melting at 187° to 189° C. This quaternary salt can be employed in my process for making merocyanine dyes by reacting with rhodanines, e. g. 3-phenylrhodanines, or other heterocyclic organic compounds containing a nuclear reactive methylene group adjacent to a nuclear carbonyl group.

Example 30.—1-(α-naphthoxy)-benzothiazole 17 g. (1 mol.) of 1-chlorobenzothiazole and 28.8 g. (2 mol.) of α-naphthol were treated as in Example 28. 1-(α-naphthoxy)-benzothiazole was obtained as a slightly yellowish oil boiling at 225° to 235° C. at 3 mm. of mercury pressure. Upon cooling, the oil solidified and upon recrystallization of the crystals from methyl alcohol, colorless crystals melting at 88° to 90° C. were obtained. Obtained in the same manner 1-(β-naphthoxy)-benzothiazole melted at 62° to 65° C.

Example 31. — 1-(α-naphthoxy)-benzothiazole ethiodide 6.9 g. (1 mol.) of 1-(α-naphthoxy)-benzothiazole and 6 g. (1.5 mol.) of ethyl iodide were heated in a sealed tube at about 100° C. for about 48 hours. Upon recrystallizing the reaction mass from nitromethane, the ethiodide was obtained as nearly colorless crystals melting at 188° to 190° C. This quaternary salt can be employed to prepare merocyanine dyes by my process by reacting with a rhodanine, e. g. 3-phenylrhodanine, or another heterocyclic organic compound containing a nuclear reactive methylene group adjacent to a nuclear carbonyl group.

I have found that simple merocyanine dyes containing a quinoline nucleus linked through its 4-position can advantageously be prepared from a quinoline quaternary salt and a heterocyclic organic compound containing a nuclear reactive methylene group adjacent to a nuclear carbonyl group, particularly rhodanines. The reactions are advantageously conducted in the presence of a basic condensing agent and diluent, such as the basic condensing agents and diluents set forth above. The following examples will serve to illustrate my new process.

EXAMPLE 32.—*5-(1-ethyl-4-quinolylidene)-rhodanine*

1.33 g. (1 mol.) of rhodanine, 5.7 g. (2 mol.) of quinoline ethiodide, 50 cc. of absolute ethyl alcohol and 1.4 g. (2 mol.) of potassium hydroxide (85%) were refluxed for about 10 minutes. The dye separated from the cooled reaction mixture. It was recrystallized from glacial acetic acid and obtained as beautiful wine-red crystals having a blue reflex. Its methyl alcoholic solution was pinkish-red. It melted at 285° to 287° C. with decomposition.

EXAMPLE 33.—*3-ethyl-5-(1-ethyl-4-quinolylidene)-rhodanine*

1.61 g. (1 mol.) of 3-ethylrhodanine, 5.7 g. (2 mol.) of quinoline ethiodide, 50 cc. of absolute ethyl alcohol and 1.4 g. (2 mol.) of potassium hydroxide (85%) were refluxed for about 10 minutes. The dye separated from the cooled reaction mixture. It was recrystallized from glacial acetic acid and obtained as red needles having a bluish reflex. Its methyl alcoholic solution was pinkish-red. It melted at 204° to 206° C. with decomposition.

EXAMPLE 34.—*5-(1-ethyl-4-quinolylidene)-3-phenylrhodanine*

2.11 g. (1 mol.) of 3-phenylrhodanine, 5.7 g. (2 mol.) of quinoline ethiodide, 50 cc. of absolute ethyl alcohol and 1.4 g. (2 mol.) of potassium hydroxide (85%) were refluxed for about 10 minutes. The dye separated from the cooled reaction mixture. It was recrystallized from glacial acetic acid and obtained as red needles. It melted at 281° to 282° C. with decomposition. Its methyl alcoholic solution was pinkish-red.

EXAMPLE 35.—*3-ethyl-(1,6-dimethyl-4-quinolylidene)-rhodanine*

1.61 g. (1 mol.) of 3-ethylrhodanine, 5.7 g. (2 mol.) of 6-methylquinoline methiodide, 50 cc. of absolute ethyl alcohol and 1.4 g. (2 mol.) of potassium hydroxide (85%) were refluxed for about 10 minutes. The dye separated from the cooled reaction mixture. It was recrystallized from glacial acetic acid and obtained as reddish needles having a blue reflex. Its methyl alcoholic solution was pinkish-red.

As illustrated in the above four examples, I have found it advantageous to employ an excess of both the quinoline quaternary salt and the basic condensing agent in order to obtain higher yields of dye. 100 percent excess of each is suitable.

My merocyanine dyes can be employed to manufacture optically sensitized gelatino-silver-halide, particularly gelatino-silver-chloride emulsions. My merocyanine dyes can also be employed in manufacturing light filters and in the dyeing of cellulose acetate textile yarn. The dyes containing a barbituric acid nucleus of thiobarbituric acid nucleus are particularly useful in cellulose acetate textile dyeing.

What I claim and desire to be secured by Letters Patent of the United States is:

1. A merocyanine dye characterized by the following formula:

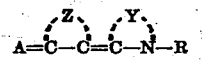

wherein A represents a divalent atom selected from the group consisting of oxygen and sulfur, R represents an alkyl group, Y represents the non-metallic atoms necessary to complete a heterocyclic nucleus selected from the group consisting of azole, azoline, indolenine, pyridine and quinoline nuclei and Z represents the non-metallic atoms necessary to complete a heterocyclic nucleus selected from the group consisting of five-membered heterocyclic nuclei containing a nuclear sulfur atom, five-membered heterocyclic nuclei containing a nuclear nitrogen atom and six-membered heterocyclic nuclei containing a nuclear nitrogen atom.

2. A merocyanine dye characterized by the following formula:

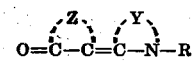

wherein R represents an alkyl group, Y represents the non-metallic atoms necessary to complete a heterocyclic nucleus selected from the group consisting of azole, azoline, indolenine, pyridine and quinoline nuclei and Z represents the non-metallic atoms necessary to complete a heterocyclic nucleus selected from the group consisting of five-membered heterocyclic nuclei containing a nuclear sulfur atom, five-membered heterocyclic nuclei containing a nuclear nitrogen atom and six-membered heterocyclic nuclei containing a nuclear nitrogen atom.

3. A merocyanine dye characterized by one of the following formulas:

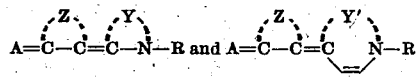

wherein A represents a divalent atom selected from the group consisting of oxygen and sulfur atoms, R represents an alkyl group, Y represents the non-metallic atoms necessary to complete a heterocyclic nucleus selected from the group consisting of azole, azoline, indolenine, pyridine and quinoline nuclei, Y' represents the non-metallic atoms necessary to complete a heterocyclic nucleus selected from the group consisting of pyridine and quinoline nuclei and Z represents the non-metallic atoms necessary to complete a heterocyclic nucleus selected from the group consisting of five-membered heterocyclic nuclei containing a nuclear sulfur atom, five-membered heterocyclic nuclei containing a nuclear nitrogen atom and six-membered heterocyclic nuclei containing a nuclear nitrogen atom.

4. A merocyanine dye characterized by the following formula:

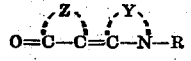

wherein R represents an alkyl group, Y represents the non-metallic atoms necessary to complete a heterocyclic nucleus selected from the group consisting of azole, azoline, indolenine, pyridine, and quinoline nucleus and Z represents the non-metallic atoms necessary to complete a five-membered heterocyclic nucleus containing a nuclear sulfur atom.

5. A merocyanine dye characterized by the following formula:

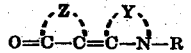

wherein R represents an alkyl group, Y represents the non-metallic atoms necessary to complete a quinoline nucleus and Z represents the non-metallic atoms necessary to complete a rhodanine nucleus.

6. A 5-(1-alkyl-2-quinolylidene)-rhodanine.

7. 5-(1-ethyl-2-quinolylidene)-rhodanine.

8. A merocyanine dye characterized by the following formula:

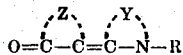

wherein R represents an alkyl group, Y represents the non-metallic atoms necessary to complete a quinoline nucleus and Z represents the non-metallic atoms necessary to complete a 2-thio-2,4,6-triketohexahydropyrimidine nucleus.

9. A 5-(1-alkyl-2-quinolylidene)-2-thio-2,4,6-triketohexahydropyrimidine.

10. 5-(1-ethyl - 2 - quinolylidene)-2-thio-2,4,6-triketohexahydropyrimidine.

11. 5 -(1 - ethyl - 2 - pyridylidene) - 3 - phenyl - rhodanine.

12. A merocyanine dye characterized by the following formula:

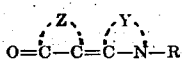

wherein R represents an alkyl group, Y represents the non-metallic atoms necessary to complete a quinoline nucleus and Z represents the non-metallic atoms necessary to complete a five-membered heterocyclic nucleus containing a nuclear sulfur atom.

13. A process for preparing a merocyanine dye comprising reacting, in the presence of a basic condensing agent, a cyclammonium quaternary salt containing, in a reactive position, a reactive group selected from the group consisting of halogen atoms, arylmercapto groups of the benzene and naphthalene series and aryloxy groups of the benzene and naphthalene series, with a heterocyclic organic compound containing a nuclear reactive methylene group adjacent to a nuclear carbonyl group.

14. A process for preparing a merocyanine dye comprising reacting, in the presence of a basic condensing agent, a cyclammonium quaternary salt containng, in a reactive position, a reactive group selected from the group consisting of halogen atoms, arylmercapto groups of the benzene and naphthalene series and aryloxy groups of the benzene and naphthalene series with a heterocyclic organic compound containing a nuclear reactive methylene group adjacent to a nuclear carbonyl group and selected from the group consisting of five-membered and six-membered heterocyclic organic compounds.

15. A process for preparing a merocyanine dye comprising reacting, in the presence of an organic base having a dissociation constant substantially greater than that of pyridine, a cyclammonium quarternary salt containing, in a reactive position, a reactive group selected from the group consisting of halogen atoms, arylmercapto groups of the benzene and naphthalene series and aryloxy groups of the benzene and naphthalene series, with a heterocyclic compound containing a nuclear reactive methylene group adjacent to a nuclear carbonyl group and selected from the group consisting of five-membered and six-membered heterocyclic organic compounds.

16. A process for preparing a merocyanine dye comprising reacting, in the presence of a tertiary organic base having a dissociation constant substantially greater than that of pyridine, a cyclammonium quaternary salt containing, in a reactive position, a reactive group selected from the group consisting of halogen atoms, arylmercapto groups of the benzene and naphthalene series and aryloxy groups of the benzene and naphthalene series, with a heterocyclic compound containing a nuclear reactive methylene group adjacent to a nuclear carbonyl group and selected from the group consisting of five-membered and six-membered heterocyclic organic compounds.

17. A process for preparing a merocyanine dye comprising reacting, in the presence of a basic condensing agent, a cyclammonium alkiodide containing, in a reactive position, an iodine atom with a heterocyclic organic compound containing a nuclear reactive methylene group adjacent to a nuclear carbonyl group and selected from the group consisting of five-membered and six-membered heterocyclic organic compounds.

18. A process for preparing a merocyanine dye comprising reacting, in the presence of a tertiary organic base having a dissociation constant substantially greater than that of pyridine, a cyclammonium alkiodide containing, in a reactive position, an iodine atom, with a heterocyclic organic compound containing a nuclear reactive methylene group adjacent to a nuclear carbonyl group and selected from the group consisting of five-membered and six-membered heterocyclic organic compounds.

19. A process for preparing a merocyanine dye comprising reacting, in the presence of a basic condensing agent, a 2-iodoquinoline alkiodide with a heterocyclic organic compound containing a nuclear methylene group adjacent to a nuclear reactive carbonyl group and selected from the group of five-membered and six-membered heterocyclic organic compounds.

20. A process for preparing a merocyanine dye comprising reacting, in the presence of a basic condensing agent, a 2-iodoquinoline alkiodide with a rhodanine.

21. A process for preparing a merocyanine dye comprising reacting, in the presence of a tertiary organic base having a dissociation constant substantially greater than pyridine, a 2-iodoquinoline alkiodide with a rhodanine.

LESLIE G. S. BROOKER.

CERTIFICATE OF CORRECTION.

Patent No. 2,185,182. January 2, 1940.

LESLIE G. S. BROOKER.

It is hereby certified that error appears in the printed specification of the above numbered patent requiring correction as follows: Page 2, first column, line 14, for the word "reaching" read --reacting--; page 7, second column, line 47, claim 19, strike out the word "reactive" and insert the same before "methylene" in line 46, same claim; and that the said Letters Patent should be read with this correction therein that the same may conform to the record of the case in the Patent Office.

Signed and sealed this 7th day of May, A. D. 1940.

(Seal)

Henry Van Arsdale,
Acting Commissioner of Patents.